United States Patent
Tominaga

(10) Patent No.: US 7,484,360 B2
(45) Date of Patent: Feb. 3, 2009

(54) EXHAUST GAS CONTROL SYSTEM FOR INTERNAL COMBUSTION ENGINE AND METHOD FOR RECOVERING FILTER THEREOF

(75) Inventor: Hiroyuki Tominaga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 185 days.

(21) Appl. No.: 10/582,683

(22) PCT Filed: Dec. 16, 2004

(86) PCT No.: PCT/IB2004/004155

§ 371 (c)(1),
(2), (4) Date: Jul. 21, 2006

(87) PCT Pub. No.: WO2005/059329

PCT Pub. Date: Jun. 30, 2005

(65) Prior Publication Data

US 2007/0157601 A1    Jul. 12, 2007

(30) Foreign Application Priority Data

Dec. 17, 2003    (JP)    ............................. 2003-419641

(51) Int. Cl.
*F01N 3/00*    (2006.01)
(52) U.S. Cl. ............................... 60/295; 60/274; 60/297
(58) Field of Classification Search .................... 60/295, 60/297, 311, 274
See application file for complete search history.

(56) References Cited

U.S. PATENT DOCUMENTS

| | | | |
|---|---|---|---|
| 4,404,795 A | | 9/1983 | Oishi et al. |
| 4,835,964 A | * | 6/1989 | Kume et al. .................... 60/285 |
| 5,319,930 A | * | 6/1994 | Shinzawa et al. ............. 60/286 |
| 5,822,977 A | | 10/1998 | Fukuda et al. |
| 6,405,528 B1 | * | 6/2002 | Christen et al. ............... 60/295 |
| 6,622,480 B2 | * | 9/2003 | Tashiro et al. ................. 60/295 |
| 6,708,487 B2 | * | 3/2004 | Morimoto et al. ............. 60/311 |
| 6,817,174 B1 | * | 11/2004 | Igarashi et al. ................ 60/295 |
| 6,854,265 B2 | * | 2/2005 | Saito et al. .................... 60/295 |
| 6,952,919 B2 | * | 10/2005 | Otake et al. ................... 60/297 |
| 7,028,466 B2 | * | 4/2006 | Kondou et al. ................ 60/295 |

FOREIGN PATENT DOCUMENTS

| | | |
|---|---|---|
| JP | A-5-321637 | 12/1993 |
| JP | A 2000-213332 | 8/2000 |
| JP | A 2002-332824 | 11/2002 |
| JP | A 2003-83031 | 3/2003 |
| JP | A 2003-155919 | 5/2003 |

* cited by examiner

*Primary Examiner*—Tu M Nguyen
(74) *Attorney, Agent, or Firm*—Oliff & Berridge, PLC

(57) ABSTRACT

In the case where an operating state of an internal combustion engine (1) belongs to a filter forced recovery region, filter forced recovery is performed (S106) when an amount of particulate matter deposited in a filter (20) becomes equal to or larger than a predetermined amount (S0). In the case where the operating state of the internal combustion engine (1) belongs to a filter continuous recovery region, the filter forced recovery is performed (S110) when the operating state of the internal combustion engine (1) continues to belong to the filter continuous recovery region for a predetermined time (T0) or longer.

5 Claims, 4 Drawing Sheets

EXHAUST GAS CONTROL SYSTEM FOR INTERNAL COMBUSTION ENGINE AND METHOD FOR RECOVERING FILTER THEREOF

BACKGROUND OF THE INVENTION

1. Field of the Invention

The invention relates to an exhaust gas control system for an internal combustion engine and a method for recovering a filter thereof.

2. Description of the Related Art

Exhaust gas discharged from an internal combustion engine contains particulate matter that mainly includes carbon. A technology is known, in which a particulate filter (hereinafter, referred to as "filter") for capturing the particulate matter is provided in an exhaust system in an internal combustion engine in order to prevent the particulate matter from being discharged to the atmosphere.

In such a filter, when the amount of captured particulate matter increases, the pressure of the exhaust gas is increased due to clogging of the filter, which leads to a decrease in engine performance. Therefore, the exhaust gas temperature on the upstream side of the filter is increased, and the captured particulate matter is oxidized and removed, whereby the exhaust gas control performance of the filter is recovered (hereinafter, this process will be referred to as "filter forced recovery").

It is known that a filter forced recovery region and a filter continuous recovery region are included in an entire range of an engine operating state decided by a rotational speed and torque of the internal combustion engine. The filter forced recovery region is an operating state range where the exhaust gas temperature is relatively low, and the amount of the particulate matter deposited in the filter increases if the filter forced recovery is not performed. The filter continuous recovery region is an operating state range where the exhaust gas temperature is relatively high, and the amount of the particulate matter deposited in the filter decreases even if the filter forced recovery is not performed.

Japanese Patent Laid-Open Publication No. 2003-155919 discloses a technology in which the amount of captured particulate matter in the filter is accumulated in the case where the operating state of the internal combustion engine belongs to the filter forced recovery region. In the case where the operating state of the internal combustion engine belongs to the filter continuous recovery region, the accumulation of the amount of the captured particulate matter is stopped, and the filter forced recovery is performed when the accumulated amount of the captured particulate matter becomes equal to or larger than a predetermined amount.

In the case where the operating state of the internal combustion engine belongs to the filter continuous recovery region, the amount of the particulate matter deposited in the filter tends to decrease even if the filter forced recovery is not performed. However, when it takes long time to oxidize the particulate matter, the particulate matter remains in the filter for a long time without being oxidized. Therefore, a relatively large agglomeration of ash may be formed after the particulate matter is oxidized, and the agglomerated ash may be deposited without being removed from the filter. Also, oxidation of the particulate matter may become insufficient.

SUMMARY OF THE INVENTION

It is an object of the invention to provide an exhaust gas control system for an internal combustion engine and a method for recovering a filter thereof, which can reduce the possibility that particulate matter may remain in a filter for a long time, and therefore oxidation of the particulate matter may become insufficient or agglomerated ash may be deposited in the case where an operating state of an internal combustion engine belongs a filter continuous recovery region where the particulate matter deposited in the filter naturally decreases.

In order to achieve the above object, the most significant characteristic of the invention is that filter forced recovery is performed in the case where the operating state of the internal combustion engine continues to belong to the filter continuous recovery region for a predetermined time period or longer.

A first aspect of the invention relates to an exhaust gas control system for an internal combustion engine, which includes a filter for capturing particulate matter in exhaust gas discharged from an internal combustion engine, the filter being provided in an exhaust passage for the internal combustion engine, and in which an entire range of an engine operating state decided by a rotational speed and torque of the internal combustion engine includes a first operating state range where a temperature of the exhaust gas discharged from the internal combustion engine is low, and the particulate matter captured by the filter is not oxidized and an amount of the particulate matter deposited in the filter increases if a recovery process is not performed, and a second operating state range where the temperature of the exhaust gas discharged from the internal combustion engine is high, and the particulate matter captured by the filter is oxidized and the amount of the particulate matter deposited in the filter decreases even if the recovery process is not performed. The exhaust gas control system includes filter forced recovery means for performing the recovery process that removes the particulate matter captured by the filter by forcibly oxidizing the particulate matter so as to recover a capturing ability of the filter; and deposited amount detection means for detecting the amount of the particulate matter that is captured by the filter and deposited in the filter.

In the first aspect of the invention, the filter forced recovery means may perform the recovery process when the amount of the particulate matter deposited in the filter which is detected by the deposited amount detection means becomes equal to or larger than a predetermined amount in a case where the operating state of the internal combustion engine belongs to the first operating state range; and the filter forced recovery means may perform the recovery process when a continuous belonging time period during which the operating state of the internal combustion engine continues to belong to the second operating state range becomes equal to or longer than a predetermined time period in a case where the operating state of the internal combustion engine belongs to the second operating state range. With this arrangement, it is possible to reduce the possibility that the particulate matter may continue to remain in the filter after the operating state of the internal combustion engine starts to belong to the second operating state range, and the possibility that oxidation of the particulate matter may become insufficient, or agglomerated ash may be deposited.

In an aspect relating to the first aspect of the invention, the predetermined time period may be decided based on the amount of the particulate matter deposited in the filter which is detected by the deposited amount detection means when the operating state of the internal combustion engine starts to belong to the second operating state range.

Even in the case where the operating state of the internal combustion engine belongs to the second operating state range, when the particulate matter captured by the filter continues to remain in the filter for a long time as described above, oxidation of the particulate matter may become insufficient, or agglomerated ash may be deposited. In the case where the operating state of the internal combustion engine belongs to the second operating state range, the continuous belonging time period until such a situation occurs is changed depending on the amount of the particulate matter deposited in the filter when the operating state of the internal combustion engine starts to belong to the second operating state range. More specifically, as the amount of the particulate matter deposited in the filter becomes larger when the operating state of the internal combustion engine starts to belong to the second operating state range, the time period until oxidation of the particulate matter becomes insufficient or agglomerated ash is deposited becomes shorter.

Thus, in the aspect relating to the first aspect of the invention, the deposited amount detection means detects the amount of the particulate matter deposited in the filter when the operating state of the internal combustion engine starts to belong to the second operating state range, and the filter forced recovery means performs the recovery process when the continuous belonging time period corresponding to the amount of the deposited particulate matter has elapsed since the operating state of the internal combustion engine starts to belong to the second operating state range.

In an example of the recovery process performed by the filter forced recovery means according to the invention, the amount of air taken in the internal combustion engine is decreased, and the temperature of the exhaust gas is increased, whereby the particulate matter deposited in the filter is oxidized and removed. In this example, since the amount of air taken in the internal combustion engine is decreased during the recovery process, drivability of a vehicle may be affected.

According to the invention, the recovery process can be performed at an optimal time in a case where the operating state of the internal combustion engine belongs to the second operating state range. As a result, it is possible to reduce the possibility that the filter forced recovery may be unnecessarily performed early, and therefore the amount of air taken in the internal combustion engine may be decreased an increased number of times, and drivability of the vehicle may be affected. Similarly, it is possible to reduce the possibility that the time at which the recovery process is performed may be delayed, and therefore oxidation of part of the particulate matter may become insufficient, or agglomerated ash may be deposited.

In the first aspect of the invention, the filter forced recovery means may perform the recovery process when an accumulated time period during which the operating state of the internal combustion engine belongs to the second operating state range after a previous recovery process is finished in a case where the operating state of the internal combustion engine belongs to the second operating state range.

With this arrangement, even in the case where the operating state of the internal combustion engine belongs to the first operating state range and the second operating state range alternately due to a change in the operating state of the internal combustion engine, the recovery process is performed when the accumulated time period during which the operating state of the internal combustion engine belongs to the second operating state range becomes equal to or longer than the predetermined time period. Accordingly, it is possible to reduce the possibility that the particulate matter may remain in the filter for a long time, and therefore oxidation of the particulate matter may be insufficient, or agglomerated ash may be deposited.

A second aspect of the invention relates to a method for recovering a filter of an exhaust gas control system for an internal combustion engine, which includes a filter for capturing particulate matter in exhaust gas discharged from an internal combustion engine, the filter being provided in an exhaust passage for the internal combustion engine; filter forced recovery means for performing a recovery process that removes the particulate matter captured by the filter by forcibly oxidizing the particulate matter so as to recover a capturing ability of the filter; and deposited amount detection means for detecting an amount of the particulate matter that is captured by the filter and deposited in the filter, and in which an entire range of an engine operating state decided by a rotational speed and torque of the internal combustion engine includes a first operating state range where a temperature of the exhaust gas discharged from the internal combustion engine is low, and the particulate matter captured by the filter is not oxidized and an amount of the particulate matter deposited in the filter increases if the recovery process is not performed, and a second operating state range where the temperature of the exhaust gas discharged from the internal combustion engine is high, and the particulate matter captured by the filter is oxidized and the amount of the particulate matter deposited in the filter decreases even if the recovery process is not performed. The method for recovering a filter includes the steps of detecting the amount of the particulate matter deposited in the filter using the deposited amount detection means in a case where the operating state of the internal combustion engine belongs to the first operating state range; and performing the recovery process using the filter forced recovery means when the detected amount of the particulate matter deposited in the filter becomes equal to or larger than a predetermined amount in the case where the operating state of the internal combustion engine belongs to the first operating state range.

In the second aspect of the invention, the method for recovering a filter may further include the step of performing the recovery process using the filter forced recovery means when a continuous belonging time period during which the operating state of the internal combustion engine continues to belong to the second operating state range becomes equal to or longer than a predetermined time period in a case where the operating state of the internal combustion engine belongs to the second operating state range.

In an aspect relating to the second aspect of the invention, the method for recovering a filter may further include the step of performing the recovery process when an accumulated time period during which the operating state of the internal combustion engine belongs to the second operating state range after a previous recovery process is finished in a case where the operating state of the internal combustion engine belongs to the second operating state range.

In the first aspect and the second aspect of the invention, it is possible to reduce the possibility that the particulate matter may remain in the filter for a long time, and therefore oxidation of the particulate matter may become insufficient, or the possibility that a relatively large agglomeration of ash may be formed after the particulate matter is oxidized, and therefore it may become difficult to remove the agglomerated ash from the filter.

The means for achieving the object of the invention can be used in as many combinations as possible.

DETAILED DESCRIPTION OF THE PREFERRED EMBODIMENTS

Hereinafter, an exemplary embodiment of the invention will be described with reference to the accompanying drawings.

Figure 1:
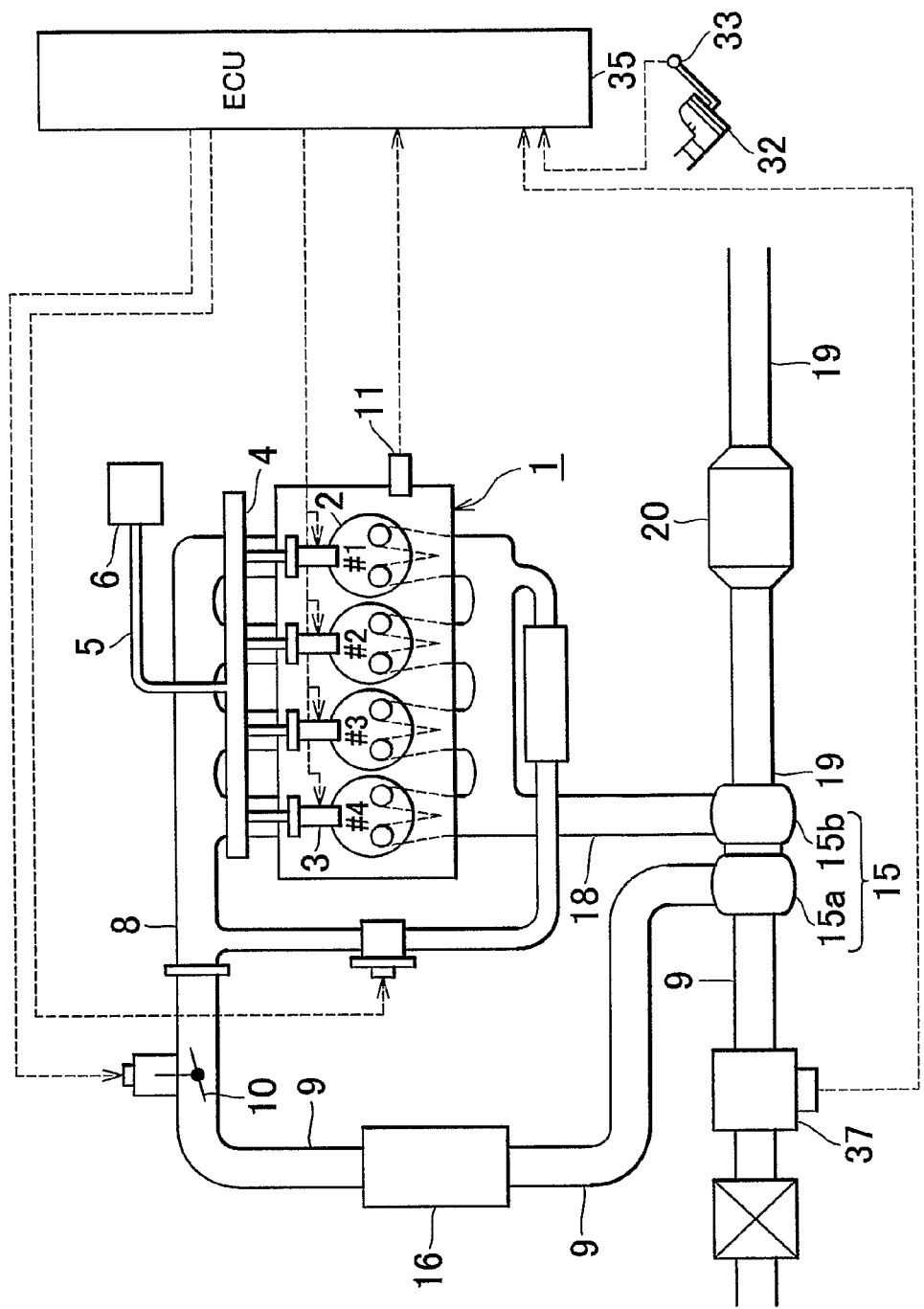
FIG. 1 is a schematic diagram showing an internal combustion engine and an exhaust gas control system according to the invention.

FIG. 1 is a schematic diagram showing an internal combustion engine and an exhaust gas control system according to the invention. An internal combustion engine 1 shown in FIG. 1 is a multi-cylinder diesel engine including four cylinders 2.

The internal combustion engine 1 includes fuel injection valves 3 each of which injects fuel directly into a combustion chamber of each cylinder 2. Each fuel injection valve 3 is connected to an accumulation pressure chamber (common rail) 4 which accumulates pressure of fuel so that the pressure of fuel becomes equal to a predetermined pressure. The common rail 4 communicates with a fuel pump 6 via a fuel supply pipe 5. The internal combustion engine 1 includes a crank position sensor 11 which detects the angle of a crankshaft (not shown) that is an output shaft of the internal combustion engine 1.

Also, the internal combustion engine 1 is connected to an intake branch pipe 8. An upstream portion of the intake branch pipe 8 is connected to an intake passage 9. The intake passage 9 includes an intake throttle valve 10 which controls the amount of intake air that passes through the intake passage 9 and flows into the internal combustion engine 1. Also, a compressor housing 15a of a turbocharger 15 and an intercooler 16 are provided further upstream in the intake passage 9. The intercooler 16 cools intake air whose temperature has been increased due to compression in the compressor housing 15a. Also, an air flow meter 37 is provided further upstream in the intake passage 9. The air flow meter 37 outputs an electric signal corresponding to the mass of intake air flowing in the intake passage 9.

Meanwhile, an exhaust branch pipe 18 is connected to the internal combustion engine 1. The exhaust branch pipe 18 is connected to a turbine housing 15b of the turbocharger 15. The turbine housing 15b is connected to an exhaust passage 19. A muffler (not shown) is connected to the exhaust passage 19 at a downstream portion.

A filter 20 which captures particulate matter in the exhaust gas (for example, soot) is provided in the exhaust passage 19.

As the filter 20, it is possible to employ, for example, a wall-flow type filter made of porous base material which captures particulate matter contained in the exhaust gas, a filter in which an oxidation catalyst such as platinum (Pt) is supported, a filter in which the oxidation catalyst, and a filter in which a NOx adsorbing agent such as potassium (K) and cesium (Cs) are supported.

An electronic control unit (hereinafter, referred to as ECU) 35 is provided for the internal combustion engine 1 thus configured. The ECU 35 controls an operating state of the internal combustion engine 1 and the like, according to an operating condition and a request of a driver.

The ECU 35 is connected to the crank position sensor 11, the air flow meter 37, and an accelerator position sensor 33 via electric wiring, and thus the ECU 35 receives output signals thereof. The accelerator position sensor 33 outputs a signal corresponding to an accelerator opening degree which is associated with the operation of the accelerator pedal 32 performed by the driver.

Accordingly, the ECU 35 can detect torque of the internal combustion engine 1 based on the output signal of the accelerator position sensor 33. Similarly, the ECU 35 can detect the rotational speed of the internal combustion engine 1 based on the output signal of the crank position sensor 11. Also, the ECU 35 is connected to the fuel injection valves 3, the intake throttle valve 10 which controls the intake air amount, and the like via electric wiring, and thus the ECU 35 controls the fuel injection valves 3, the intake throttle valve 10, and the like.

Also, the ECU 35 includes a CPU, ROM, RAM, and the like. The ROM stores programs and maps storing data which are used for performing various controls of the internal combustion engine 1. Examples of the programs stored in the ROM of the ECU include a filter forced recovery routine in this embodiment as described below.

Filter forced recovery in a conventional filter 20 will be described. In the filter 20, when the amount of the captured particulate matter increases, the pressure of the exhaust gas may be increased due to clogging of the filter 20, and the engine performance may be decreased.

Accordingly, when the amount of the particulate matter deposited in the filter 20 increases, for example, the opening degree of the intake throttle valve 10 is decreased according to a command from the ECU 35, and the exhaust gas temperature on the upstream side of the filter 20 is increased, whereby the captured particulate matter is oxidized and removed. Thus, the exhaust gas control performance of the filter 20 is recovered by this filter forced recovery. In this case, the filter recovery means is configured to include the ECU 35, and the intake throttle valve 10.

In this embodiment, the filter forced recovery is performed according to the aforementioned method. However, the method for performing the filter forced recovery is not limited to the aforementioned method. For example, when the filter forced recovery is performed, the fuel supply means (not shown) may supply fuel, as a reducing agent, to the filter 20 or an oxidation catalyst (not shown) provided on the upstream side of the filter 20, whereby the particulate matter deposited in the filter 20 is oxidized and removed. In this case, the filter recovery means is configured to include the ECU 35 and the fuel supply means.

In this case, the fuel supply means may be, for example, a fuel injection valve (not shown) which is provided in the exhaust passage 19, and which injects fuel directly into the exhaust gas. Also, the fuel supply means may be the fuel injection valve 3 which performs so-called sub-injection during the expansion stroke and the exhaust stroke in the internal combustion engine.

Figure 2:
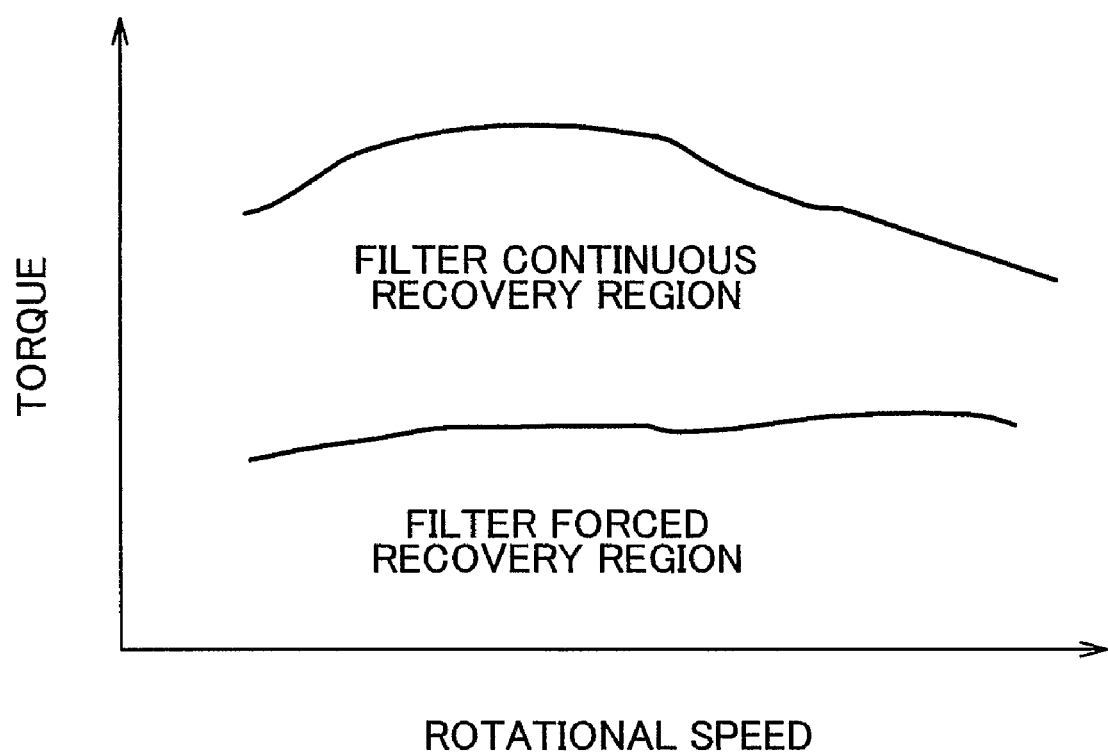
FIG. 2 is a diagram showing a relationship between a filter forced recovery region and a filter continuous recovery region according to a first embodiment.

It is known that a filter forced recovery region and a filter continuous recovery region are included in an entire engine operating state range to which an operating state of the internal combustion engine belongs. The filter forced recovery region is an operating state range where the exhaust gas temperature is relatively low, and the amount of the particulate matter deposited in the filter increases if the filter forced recovery is not performed. The filter continuous recovery region is an operating state range where the exhaust gas temperature is relatively high, and the amount of the particulate matter deposited in the filter decreases even if the filter forced recovery is not performed. FIG. 2 shows the relationship between the filter forced recovery region and the filter continuous recovery region. In this embodiment, the filter forced recovery region can be regarded as the first operating state range, and the filter continuous recovery region can be regarded as the second operating state range.

The filter forced recovery region is an operating state range where the load is relatively low, and the exhaust gas temperature is relatively low, as shown in FIG. 2. Accordingly, in the filter forced recovery region, in most cases, the amount of the particulate matter captured by the filter 20 is larger than the amount of the particulate matter oxidized in the filter 20. Thus, when the operating state of the internal combustion engine continues to belong to the filter forced recovery region, the amount of the particulate matter deposited in the filter 20 gradually increases.

The filter continuous recovery region is the operating state range where the load is relatively high, and the exhaust gas temperature is relatively high. Accordingly, in the filter continuous recovery region, in most cases, the amount of the particulate matter oxidized in the filter 20 is larger than the amount of the particulate matter captured by the filter 20. Thus, when the operating state of the internal combustion engine continues to belong to the filter continuous recovery region, the amount of the particulate matter deposited in the filter 20 gradually decreases. The amount of the particulate matter deposited in the filter 20 decreases at a high speed in a high-load operating state range in the filter forced recovery region. Meanwhile, the amount of the particulate matter deposited in the filter 20 decreases at a low speed in a low-load operating state range in the filter forced recovery region.

The tendency in each operating state range described above is a general tendency. Accordingly, for example, the amount of the particulate matter captured by the filter 20 may not decrease during a certain period immediately after the operating state of the internal combustion engine starts to belong to the filter continuous recovery region, for the reason that the increase in the temperature of the filter 20 is delayed due to heat capacity of the filter 20, or other reason.

In the conventional filter forced recovery, in the case where the operating state of the internal combustion engine 1 belongs to the filter forced recovery region, the amount of the particulate matter captured by the filter 20 is accumulated, and the filter forced recovery is performed when the accumulated amount of the captured particulate matter becomes equal to or larger than a predetermined amount. In the case where the operating state of the internal combustion engine belongs to the filter continuous recovery region, the accumulation of the amount of the particulate matter captured by the filter 20 is stopped. This control is performed because it is considered that the particulate matter deposited in the filter 20 decreases even if the filter forced recovery is not performed in the case where the operating state of the internal combustion engine 1 belongs to the filter continuous recovery region.

However, even in the filter continuous recovery region, it may take a long time to oxidize the particulate matter deposited in the filter in the range where the exhaust gas temperature is relatively low. In this case, since the deposited particulate matter remains in the filter 20 for a long time without being oxidized, oxidation of the particulate matter may become insufficient, or agglomerated ash may be deposited.

In this embodiment, in the case where the operating state of the internal combustion engine 1 belongs to the filter forced recovery region, the amount of the particulate matter captured by the filter 20 is accumulated, and the filter forced recovery is performed when the accumulated amount of the captured particulate matter becomes equal to or larger than the predetermined amount. Also, in the case where the operating state of the internal combustion engine 1 continues to belong to the filter continuous recovery region for a predetermined time period or longer, the filter forced recovery is performed.

Figure 3:
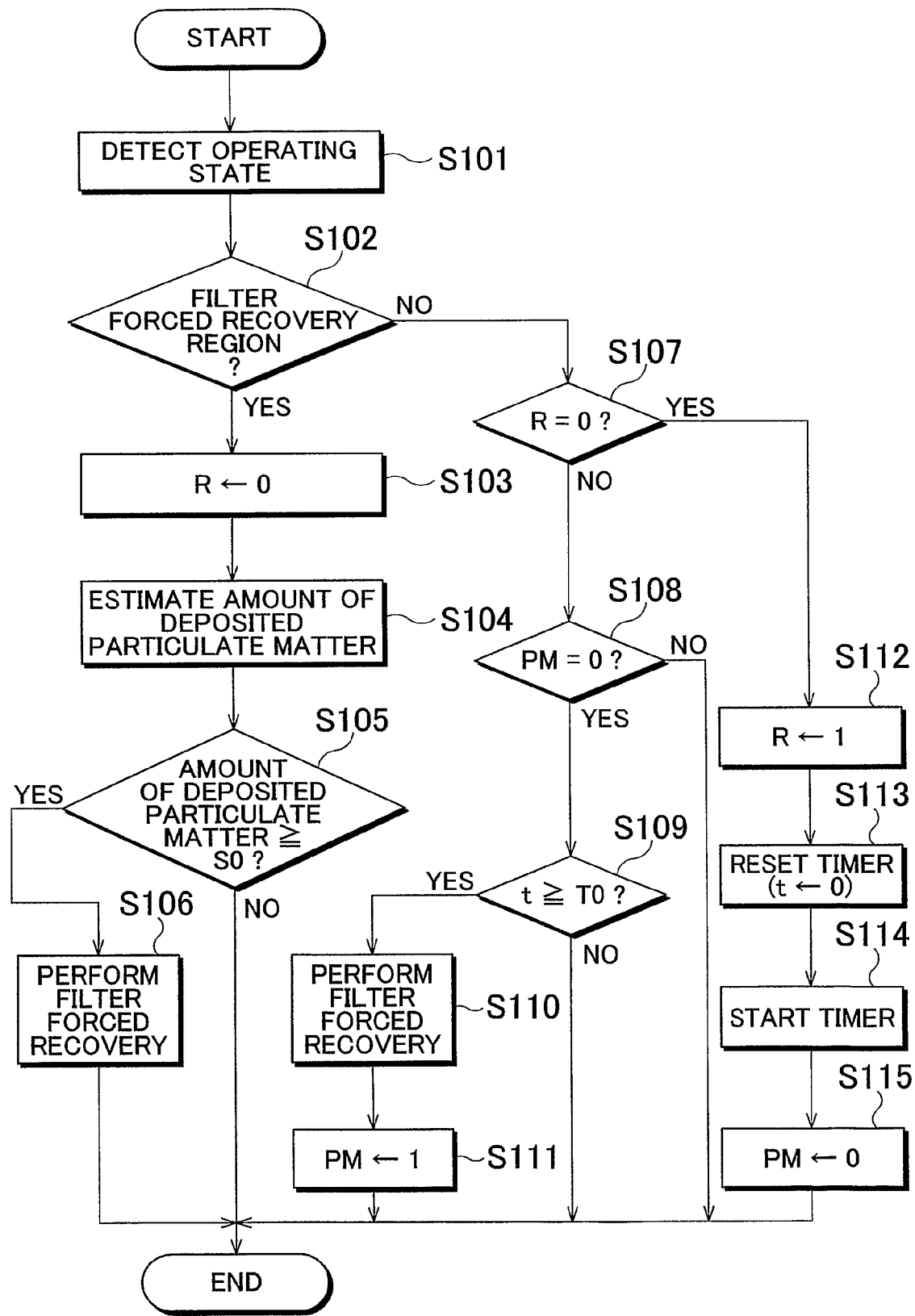
FIG. 3 is a flowchart showing a filter forced recovery routine according to the first embodiment.

FIG. 3 shows the filter forced recovery routine according to this embodiment. This routine is a program stored in the ROM of the ECU 35. This routine is performed at predetermined time intervals while the internal combustion engine 1 is operated.

When this routine is performed, first, the operating state of the internal combustion engine 1 is detected in step S101. More specifically, the ECU 35 reads the output signal of the accelerator position sensor 33, and the output signal of the crank position sensor 11, whereby the torque and the rotational speed of the internal combustion engine 1 are detected.

Next, in step S102, it is determined whether the operating state of the internal combustion engine 1 is in the filter forced recovery region. In the case where the operating state of the internal combustion engine 1 is in the filter forced recovery region, the routine proceeds to step S103. A variable R is set to 0. The variable R indicates whether the operating state of the internal combustion engine 1 belongs to the filter forced recovery region or the filter continuous recovery region. When the operating state of the internal combustion engine 1 belongs to the filter forced recovery region, the variable R is set to 0. When the operating state of the internal combustion engine 1 belongs to the filter continuous recovery region, the variable R is set to 1.

Although not shown in FIG. 3, in the filter forced recovery routine, when it is determined that the operating state of the internal combustion engine 1 belongs to the filter forced recovery region in step S102, the calculation of the intake air amount is started or continued in order to estimate the amount of the particulate matter deposited in the filter 20 (the accumulated amount of the captured particulate matter). When it is determined that the operating state of the internal combustion engine 1 belongs to the filter continuous recovery region in step S102, the accumulation of the intake air amount is stopped. Since this process is performed also in the conventional example, description of this process is omitted in FIG. 3.

Next, the routine proceeds to step S104, and the amount of the particulate matter deposited in the filter 20 (the accumulated amount of the captured particulate matter) is estimated. More specifically, a calculation is performed to obtain the accumulated intake air amount in the period during which the operating state of the internal combustion engine 1 belongs to the filter forced recovery region since the previous filter forced recovery is finished. Thus, the amount of the deposited particulate matter is estimated. That is, since the ECU 35 reads the output signal of the air flow meter 37, the present intake air amount is detected. Since the intake air amount is accumulated in the ECU 35, the accumulated intake air amount is obtained. Since the amount of the deposited particulate matter corresponding to the accumulated intake air amount is read out from a map storing the relationship between the accumulated intake air amount and the amount of the particulate matter. The map is made in advance through experiments. Thus, the amount of the deposited particulate matter is estimated. In this embodiment, the deposited amount detection means is configured to include the ECU 35 and the air flow meter 37.

The invention is not limited to the aforementioned method of estimating the amount of the particulate matter deposited in the filter 20. For example, the amount of the deposited particulate matter may be based on the accumulated fuel injection amount, the running distance of the vehicle, or the like, instead of the accumulated intake air amount. Also, exhaust gas pressure sensors (not shown) may be provided on the upstream side and the downstream side of the filter 20 in the exhaust system. The amount of the particulate matter deposited in the filter 20 may be estimated based on the difference between the exhaust gas pressures detected by both sensors.

Then, in step S105, it is determined whether the amount of the deposited particulate matter estimated in step S104 is equal to or larger than S0. S0 is the amount of the particulate matter deposited in the filter 20, which is obtained in advance through experiments. If the amount of the particulate matter deposited in the filter 20 is equal to or larger than S0, it is determined that the exhaust gas pressure may be increased due to clogging of the filter, and the engine performance may be decreased. When it is determined that the amount of the deposited particulate matter is equal to or larger than S0 in step S105, the routine proceeds to step S106. In step S106, the filter forced recovery is performed. Then, the routine is terminated.

When the amount of the deposited particulate matter is smaller than S0 in step S105, it can be determined that the filter forced recovery does not need to be performed at this time. Therefore, the routine is terminated.

Next, when it is determined that the operating state of the internal combustion engine 1 does not belong to the filter forced recovery region in step S102, it can be determined that the operating state of the internal combustion engine 1 belongs to the filter continuous recovery region. Therefore, the routine proceeds to step S107. In step S107, it is determined whether the value of the variable R is 0. When it is determined that the value of the variable R is 0, it is determined that the operating state of the internal combustion engine 1 belonged to the filter forced recovery region when the previous routine was performed. Therefore, the routine proceeds to step S112, and the variable R is set to 1. Then, the routine proceeds to step S113, and a filter continuous recovery region belonging time period t is set to 0, whereby a timer is reset. The filter continuous recovery region belonging time period t indicates a time period during which the operating state of the internal combustion engine 1 continues to belong to the filter continuous recovery region. Then, in step S114, the timer starts counting. That is, counting of the filter continuous recovery region belonging time period t is started.

Then, the routine proceeds to step S115, and a variable PM is set to 0. The variable PM is set to 0 during a period since the operating state of the internal combustion engine 1 starts to belong to the filter continuous recovery region until the filter forced recovery is performed. The variable PM is set to 1 when the operating state of the internal combustion engine 1 belongs to the filter continuous recovery region, and the filter forced recovery has been performed. After the process in step S115 is performed, the routine is terminated.

In step S107, when it is determined that the value of the variable R is 1, it can be determined that the operating state of the internal combustion engine 1 belonged to the filter continuous recovery region when the previous routine was performed. Therefore, the routine proceeds to step S108. In step S108, it is determined whether the value of the variable PM is 0. When it is determined that the value of PM is 1, it can be determined that the filter forced recovery has been already performed once while the operating state of the internal combustion engine 1 belongs to the filter continuous recovery region. Therefore, the routine is terminated. That is, in the case where the operating state of the internal combustion engine 1 continues to belong to the filter continuous recovery region, the particulate matter deposited in the filter 20 is forcibly oxidized and removed if the filter forced recovery is performed once. In this case, even if the operating state of the internal combustion engine 1 continues to belong to the filter continuous recovery region thereafter, the particulate matter is not deposited in the filter 20. Therefore, it can be considered that it is sufficient to perform the filter forced recovery once in the case where the operating state of the internal combustion engine 1 continues to belong to the filter continuous recovery region.

Meanwhile, in step S108, when it is determined that the value of the variable PM is 0, it is determined that the filter forced recovery has not been performed since the operating state of the internal combustion engine 1 started to belong to the filter continuous recovery region. In this case, the routine proceeds to step S109.

In step S109, it is determined whether the filter continuous recovery region belonging time period t is equal to or longer than T0. T0 is a time period which is obtained in advance through experiments. If the particulate matter continues to remain in the filter 20 for the time period T0 or longer even in the case where the operating state of the internal combustion engine 1 belongs to the filter continuous recovery region, oxidation of the particulate matter may become insufficient or agglomerated ash may be deposited. When it is determined that the filter continuous recovery region belonging time period t is equal to or longer than T0, it is determined that the filter forced recovery needs to be performed. Therefore, the routine proceeds to step S110, and the filter forced recovery is performed in step S110. Thus, even in the case where the operating state of the internal combustion engine 1 belongs to the filter continuous recovery region, the particulate matter deposited in the filter 20 is forcibly oxidized and removed.

After the process in step S110 is finished. The variable PM is set to 1 in step S111, and then the routine is terminated. When it is determined that the filter continuous recovery region belonging time period t is shorter than T0, it is determined that the there is a small possibility that oxidation of the particulate matter may become insufficient or agglomerated ash may be deposited even if the operating state of the internal combustion engine 1 continues to belong to the filter continuous recovery region. Therefore, the routine is terminated.

As described above, in this embodiment, in the case where the operating state of the internal combustion engine 1 belongs to the filter forced recovery region, the intake air amount is accumulated, and the amount of the particulate matter deposited in the filter 20 is estimated based on the accumulated intake air amount. When the accumulated amount of the particulate matter is equal to or larger than S0, the filter forced recovery is performed. In the case where the operating state of the internal combustion engine 1 belongs to the filter continuous recovery region, the accumulation of the intake air amount is basically stopped since the amount of the particulate matter deposited in the filter 20 decreases. However, when the operating state of the internal combustion engine 1 continues to belong to the filter continuous recovery region for the time period T0 or longer, the filter forced recovery is performed. Thus, it is possible to reduce the possibility that the particulate matter may remain in the filter 20 for a long time without being oxidized, and therefore oxidation of the particulate matter may become insufficient or agglomerated ash may be deposited.

In this embodiment, the constant value that is obtained in advance through experiments is used as T0 in step S109. However, the value of T0 may be changed according to the amount of the deposited particulate matter that was estimated when the step S104 was performed during the previous routine. This is because a time period until oxidation of the particulate matter becomes insufficient or agglomerated ash is deposited is changed depending on the amount of the particulate matter deposited in the filter 20 when the operating state of the internal combustion engine 1 starts to belong to the filter continuous recovery region, in the case where the particulate matter continues to remain in the filter 20.

More specifically, a map is made so as to define the relationship between the amount of the particulate matter deposited in the filter 20 when the operating state of the internal combustion engine 1 starts to belong to the filter continuous recovery region, and the value of T0. In step S109, the value of T0 corresponding to the amount of the deposited particulate matter that was estimated when step S104 was performed during the previous routine is read from the map, and the value of T0 is compared to the value of the filter continuous recovery region belonging time period t. Thus, it is possible to perform the filter forced recovery after a lapse of a time period that more accurately corresponds to the amount of the particulate matter deposited in the filter 20 when the operating state of the internal combustion engine 1 starts to belong to the filter continuous recovery region.

As a result, it is possible to reduce the possibility that the filter forced recovery may be unnecessarily performed early, and therefore the opening degree of the intake throttle valve 10 may be decreased an increased number of times, and drivability of the vehicle may be affected, or the possibility that the time at which the filter forced recovery is performed may be delayed, and therefore oxidation of part of the particulate matter may become insufficient, or agglomerated ash may be deposited.

Next, a second embodiment of the invention will be described. Since the hardware configuration of the internal combustion engine 1 in this embodiment is the same as that in the first embodiment, description thereof will be omitted.

In the second embodiment, in the case where the operating state of the internal combustion engine 1 belongs to the filter forced recovery region, the amount of the particulate matter deposited in the filter 20 is estimated, and the filter forced recovery is performed when the amount of the deposited particulate matter becomes larger than the predetermined amount, as in the first embodiment. Meanwhile, in the case where the operating state of the internal combustion engine 1 belongs to the filter continuous recovery region, the filter forced recovery is performed when an accumulated time period during which the operating state of the internal combustion engine 1 belongs to the filter continuous recovery region becomes equal to or longer than a predetermined time period after the previous filter forced recovery is finished. Hereinafter, this control will be described.

Figure 4:
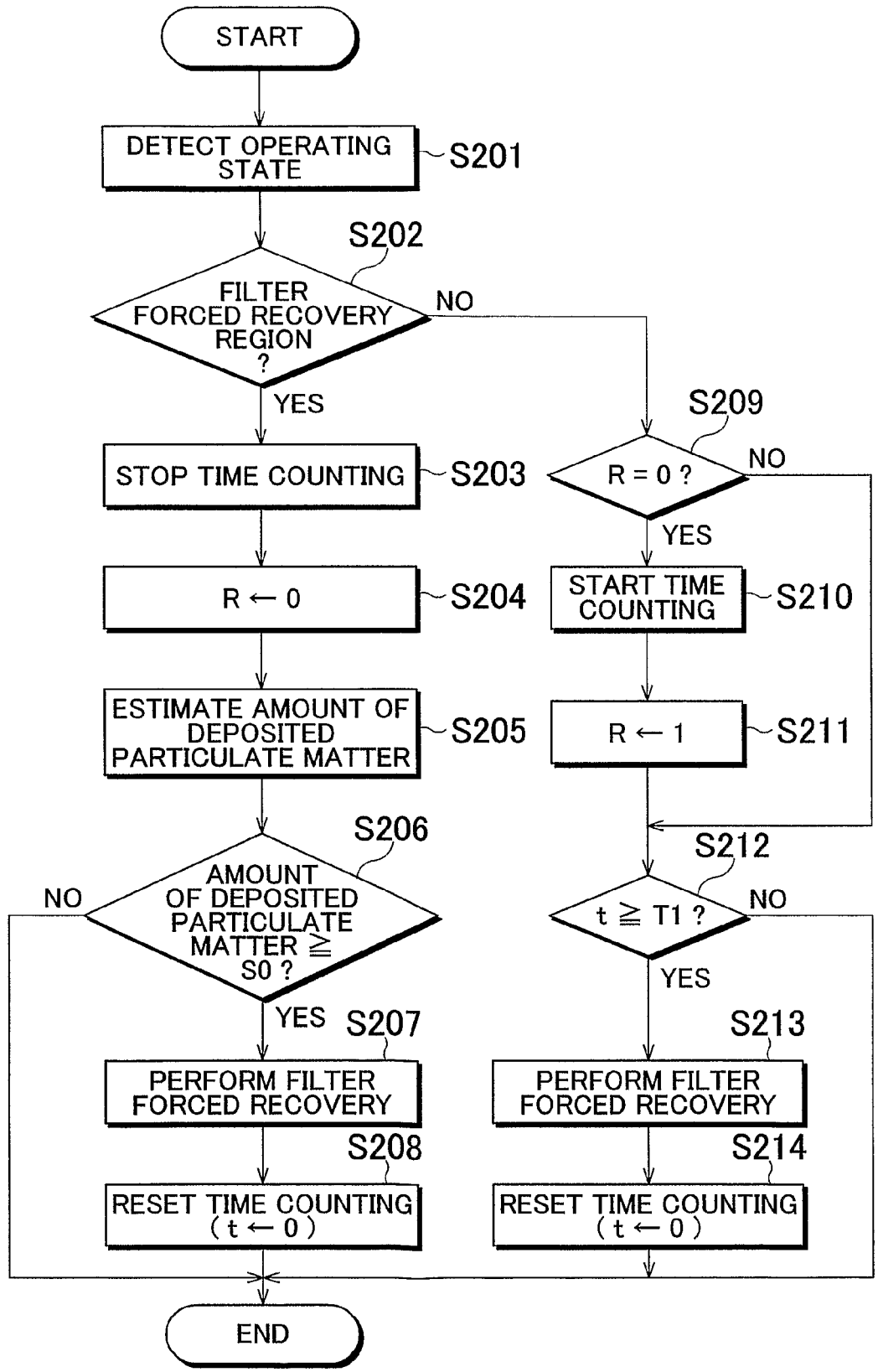
FIG. 4 is a flowchart showing a filter forced recovery routine according to a second embodiment.

FIG. 4 shows a filter forced recovery routine according to the second embodiment. This routine is a program stored in the ROM of the ECU 35. This routine is performed at predetermined time intervals while the internal combustion engine 1 is operated.

When this routine is performed, the operating state of the internal combustion engine 1 is detected in step S201, as in the control according to the aforementioned first embodiment. In step S202, it is determined whether the operating state of the internal combustion engine 1 belongs to the filter forced recovery region. When it is determined that the operating state of the internal combustion engine 1 belongs to the filter forced recovery region, the routine proceeds to step S203. In step S203, when time counting continues, the time counting is stopped. This time counting is performed in order to count the accumulated time period during which the operating state of the internal combustion engine 1 belongs to the filter continuous recovery region in this routine, as described later. Accordingly, when the operating state of the internal combustion engine 1 belongs to the filter forced recovery region, the time counting is stopped.

Although not shown in FIG. 4, in this filter forced recovery routine, when it is determined that the operating state of the internal combustion engine 1 belongs to the filter forced recovery region in step S202, the accumulation of the intake air amount is started or continued. When it is determined that the operating state of the internal combustion engine 1 belongs to the filter continuous recovery region in step S202, the accumulation of the intake air amount is stopped. Since these processes are performed even in the conventional example, description of the processes is omitted in FIG. 4.

Next, in steps S204 to S207, the same processes as those in steps S103 to S106 in the first embodiment are performed. Since the processes have been already described in detail, description thereof is omitted. After the filter forced recovery is performed in step S207, the routine proceeds to step S208. In step 208, the filter continuous recovery region belonging time period t is set to 0, and time counting is reset. That is, in this embodiment, since the accumulated time period during which the operating state of the internal combustion engine 1 belongs to the filter continuous recovery region is counted after the filter forced recovery is performed, time counting is reset when the filter forced recovery is performed. After the process in step S208 is finished, the routine is terminated. When it is determined that the amount of the deposited particulate matter is smaller than S0 in step S206, the routine is terminated, as in step S105 in the first embodiment.

When it is determined that the operating state of the internal combustion engine 1 belongs to the filter continuous recovery region in step S202, the routine proceeds to step S209. In step S209, it is determined whether the variable R is 0. The variable R is the same as the variable R used in step S107 in the first embodiment. When it is determined that the variable R is 0, the routine proceeds to step S210. In step S210, the time counting is started or restarted. That is, when it is determined that the variable R is 0 in step S209, it is considered that the operating state of the internal combustion engine 1 belonged to the filter forced recovery region when the previous routine was performed, and the operating state of the internal combustion engine 1 started to belong to the filter continuous recovery region during a time period since the previous routine was finished until the present routine was started. Therefore, the accumulated time period during which the operating state of the internal combustion engine 1 belongs to the filter continuous recovery region starts to be counted, or restarts to be counted.

Next, in step S211, the variable R is set to 1. Thus, the value of the variable R indicates that the operating state of the internal combustion engine 1 belongs to the filter continuous recovery region. Then, the routine proceeds to step S212. In step S212, it is determined whether the filter continuous recovery region belonging time period t is equal to or longer than T1. T1 is a time period which is obtained in advance through experiments. If the accumulated time period during which the operating state of the internal combustion engine 1 belongs to the filter continuous recovery region is T1 or longer, oxidation of the particulate matter may become insufficient, or agglomerated ash may be deposited.

Accordingly, when it is determined that the filter continuous recovery region belonging time period t is equal to or longer than T1 in step S212, it is determined that oxidation of the particulate matter deposited in the filter 20 may become insufficient or agglomerated ash may be deposited if the filter forced recovery is not performed. Therefore, the routine proceeds to step 213, and the filter forced recovery is performed in step 213.

After the process in step S213 is finished, the filter continuous recovery region belonging time period t is set to 0, and the timer is reset in step S214, as in step S208. Then, the routine is terminated. When it is determined that the filter continuous recovery region belonging time period t is shorter than T1 in step S212, it is determined that the filter forced recovery does not need to be performed. Therefore, the routine is terminated.

When it is determined that the value of the variable R is 1 in step S209, it is determined that the operating state of the internal combustion engine 1 already belonged to the filter continuous recovery region when the previous routine was performed. Therefore, the process for starting the time counting and the process for setting the variable R to 1 are skipped, and the routine proceeds to step S212.

As described above, in this embodiment, in the case where the operating state of the internal combustion engine 1 belongs to the filter forced recovery region, the intake air amount is accumulated, and the amount of the particulate matter deposited in the filter 20 is estimated based on the accumulated intake air amount. When the amount of the deposited particulate matter is equal to or larger than S0, the filter forced recovery is performed. In the case where the operating state of the internal combustion engine 1 belongs to the filter continuous recovery region, the accumulation of the intake air amount is basically stopped since the amount of the particulate matter deposited in the filter 20 decreases. However, the accumulated time period during which the operating state of the internal combustion engine 1 belongs to the filter continuous recovery region is equal to or longer than T1, the filter forced recovery is performed. Thus, it is possible to reduce the possibility that the particulate matter may remain in the filter 20 for a long time without being oxidized, and therefore oxidation of the particulate matter may become insufficient or agglomerated ash may be deposited.

In this embodiment, the constant value that is obtained in advance through experiments is used as T1 in step S212. However, the value of T1 may be changed according to the amount of the deposited particulate matter that was estimated when step S205 was performed during the previous routine, for the same reason as that described in the first embodiment.

In the first embodiment and the second embodiment described above, in the case where the operating state of the internal combustion engine 1 belongs to the filter forced recovery region, the filter forced recovery is performed at the time different from the time at which the filter forced recovery is performed in the case where the operating state of the internal combustion engine 1 belongs to the filter continuous recovery region. However, the operation of the filter forced recovery in the case where the operating state of the internal combustion engine 1 belongs to the filter forced recovery region is the same as the operation of the filter forced recovery in the case where the operating state of the internal combustion engine 1 belongs to the filter continuous recovery region. That is, in both cases, when the exhaust gas temperature is increased by decreasing the opening degree of the intake throttle valve 10 so that the particulate matter deposited in the filter 20 is oxidized and removed, the exhaust gas temperature is set to the same value, and the exhaust gas temperature is increased during the same time period.

However, in the case where the operating state of the internal combustion engine 1 belongs to the filter continuous recovery region, the amount of the particulate matter deposited in the filter 20 decreases even if the filter forced recovery is not performed. Accordingly, when the filter forced recovery is performed in the case where the operating state of the internal combustion engine 1 belongs to the filter continuous recovery region, the exhaust gas temperature may be set to a low value, as compared to when the filter forced recovery is performed in the case where the operating state of the internal combustion engine 1 belongs to the filter forced recovery region. Similarly, when the filter forced recovery is performed in the case where the operating state of the internal combustion engine 1 belongs to the filter continuous recovery region, the exhaust gas temperature is increased during a short time period, as compared to when the filter forced recovery is performed in the case where the operating state of the internal combustion engine 1 belongs to the filter forced recovery region. Thus, it is possible to further reduce the possibility that drivability of the vehicle may be affected by a decrease in the opening degree of the intake throttle valve 10 in the filter forced recovery.

In the first embodiment and the second embodiment described above, the entire range of the operating state of the internal combustion engine 1 is divided into two operating state ranges, that are, the particulate matter force removal region and the filter continuous recovery region. However, the invention is not limited to this case. For example, in the case where the entire range of the operating state of the internal combustion engine 1 is divided three or more operating state ranges, the invention can be applied to two operating state ranges corresponding to the filter forced recovery region and the filter continuous recovery region.

Further, in the first embodiment and the second embodiment, the invention is applied to a diesel engine. However, the invention can be applied to a gasoline engine.

The invention claimed is:

1. A method for recovering a filter of an exhaust gas control system for an internal combustion engine, which includes a filter for capturing particulate matter in exhaust gas discharged from an internal combustion engine, the filter being provided in an exhaust passage for the internal combustion engine; a filter forced recovery portion that performs a recovery process that removes the particulate matter captured by the filter by forcibly oxidizing the particulate matter so as to recover a capturing ability of the filter; and a deposited amount detection portion that detects an amount of the particulate matter captured by the filter and deposited in the filter, and in which an entire range of an engine operating state decided by a rotational speed and torque of the internal combustion engine includes a first operating state range where a temperature of the exhaust gas discharged from the internal combustion engine is low, and the particulate matter captured by the filter is not oxidized and an amount of the particulate matter deposited in the filter increases if a recovery process is not performed, and a second operating state range where the temperature of the exhaust gas discharged from the internal combustion engine is high, and the particulate matter captured by the filter is oxidized and the amount of the particulate matter deposited in the filter decreases even if the recovery process is not performed, the method comprising the steps of:

detecting the amount of the particulate matter deposited in the filter using the deposited amount detection portion in a case where the operating state of the internal combustion engine belongs to the first operating state range;

performing the recovery process using the filter forced recovery portion when the detected amount of the particulate matter deposited in the filter becomes equal to or larger than a predetermined amount in the case where the operating state of the internal combustion engine belongs to the first operating state range; and performing the recovery process using the filter forced recovery portion based on a continuous belonging time period during which the operating state of the internal combustion engine continues to belong to the second operating state range in a case where the operating state of the internal combustion engine belongs to the second operating state range; wherein the recovery process is performed when the continuous belonging time period during which the operating state of the internal combustion engine continues to belong to the second operating state range becomes equal to or longer than a predetermined time period in a case where the operating state of the internal combustion engine belongs to the second operating state range.

2. A method for recovering a filter of an exhaust gas control system for an internal combustion engine, which includes a filter for capturing particulate matter in exhaust gas discharged from an internal combustion engine, the filter being provided in an exhaust passage for the internal combustion engine; a filter forced recovery portion that performs a recovery process that removes the particulate matter captured by the filter by forcibly oxidizing the particulate matter so as to recover a capturing ability of the filter; and a deposited amount detection portion that detects an amount of the particulate matter captured by the filter and deposited in the filter, and in which an entire range of an engine operating state decided by a rotational speed and torque of the internal combustion engine includes a first operating state range where a temperature of the exhaust gas discharged from the internal combustion engine is low, and the particulate matter captured by the filter is not oxidized and an amount of the particulate matter deposited in the filter increases if a recovery process is not performed, and a second operating state range where the temperature of the exhaust gas discharged from the internal combustion engine is high, and the particulate matter captured by the filter is oxidized and the amount of the particulate matter deposited in the filter decreases even if the recovery process is not performed, the method comprising the steps of:

detecting the amount of the particulate matter deposited in the filter using the deposited amount detection portion in a case where the operating state of the internal combustion engine belongs to the first operating state range;

performing the recovery process using the filter forced recovery portion when the detected amount of the particulate matter deposited in the filter becomes equal to or larger than a predetermined amount in the case where the operating state of the internal combustion engine belongs to the first operating state range;

performing the recovery process using the filter forced recovery portion based on a continuous belonging time period during which the operating state of the internal combustion engine continues to belong to the second operating state range in a case where the operating state of the internal combustion engine belongs to the second operating state range; and performing the recovery process when an accumulated time period during which the operating state of the internal combustion engine belongs to the second operating state range after a previous recovery process is finished becomes equal to or longer than a predetermined time period.

3. An exhaust gas control system for an internal combustion engine, comprising:

an internal combustion engine, and a filter for capturing particulate matter in exhaust gas discharged from the internal combustion engine, the filter being provided in an exhaust passage for the internal combustion engine, wherein an entire range of an engine operating state decided by a rotational speed and torque of the internal combustion engine includes a first operating state range where a temperature of the exhaust gas discharged from the internal combustion engine is low, and the particulate matter captured by the filter is not oxidized and an amount of the particulate matter deposited in the filter increases if a recovery process is not performed, and a second operating state range where the temperature of the exhaust gas discharged from the internal combustion engine is high, and the particulate matter captured by the filter is oxidized and the amount of the particulate matter deposited in the filter decreases even if the recovery process is not performed, and the exhaust gas control system further comprises a filter forced recovery portion that performs the recovery process that removes the particulate matter captured by the filter by forcibly oxidizing the particulate matter so as to recover a capturing ability of the filter; and a deposited amount detection portion that detects an amount of the particulate matter that is captured by the filter and deposited in the filter, wherein:

the filter forced recovery portion performs the recovery process when the amount of the particulate matter deposited in the filter which is detected by the deposited amount detection portion becomes equal to or larger than a predetermined amount in a case where the operating state of the internal combustion engine belongs to the first operating state range;

the filter forced recovery portion performs the recovery process based on a continuous belonging time period during which the operating state of the internal combustion engine continues to belong to the second operating state range in a case where the operating state of the internal combustion engine belongs to the second operating state range; and the filter forced recovery portion performs the recovery process when the continuous belonging time period during which the operating state of the internal combustion engine continues to belong to the second operating state range becomes equal to or longer than a predetermined time period in a case where the operating state of the internal combustion engine belongs to the second operating state range.

4. The exhaust gas control system according to claim 3, wherein the predetermined time period is decided based on the amount of the particulate matter deposited in the filter which is detected by the deposited amount detection portion when the operating state of the internal combustion engine starts to belong to the second operating state range.

5. An exhaust gas control system for an internal combustion engine, comprising:

an internal combustion engine, and a filter for capturing particulate matter in exhaust gas discharged from the internal combustion engine, the filter being provided in an exhaust passage for the internal combustion engine, wherein an entire range of an engine operating state decided by a rotational speed and torque of the internal combustion engine includes a first operating state range where a temperature of the exhaust gas discharged from the internal combustion engine is low, and the particulate matter captured by the filter is not oxidized and an amount of the particulate matter deposited in the filter increases if a recovery process is not performed, and a second operating state range where the temperature of the exhaust gas discharged from the internal combustion engine is high, and the particulate matter captured by the filter is oxidized and the amount of the particulate matter deposited in the filter decreases even if the recovery process is not performed, and the exhaust gas control system further comprises a filter forced recovery portion that performs the recovery process that removes the particulate matter captured by the filter by forcibly oxidizing the particulate matter so as to recover a capturing ability of the filter; and a deposited amount detection portion that detects an amount of the particulate matter that is captured by the filter and deposited in the filter, wherein:

the filter forced recovery portion performs the recovery process when the amount of the particulate matter deposited in the filter which is detected by the deposited amount detection portion becomes equal to or larger than a predetermined amount in a case where the operating state of the internal combustion engine belongs to the first operating state range;

the filter forced recovery portion performs the recovery process based on a continuous belonging time period during which the operating state of the internal combustion engine continues to belong to the second operating state range in a case where the operating state of the internal combustion engine belongs to the second operating state range; and the filter forced recovery portion performs the recovery process when an accumulated time period during which the operating state of the internal combustion engine belongs to the second operating state range after a previous recovery process is finished becomes equal to or longer than a predetermined time period.

* * * * *